Dec. 1, 1953 C. W. LEMMERMAN 2,661,072
AIR-COOLED EXHAUST MUFFLER WITH SOUND ABSORBING PANELS
Filed Nov. 14, 1950 2 Sheets-Sheet 2

Inventor
CARL W. LEMMERMAN
By
Lindsey and Prutzman
Attorneys

Patented Dec. 1, 1953

2,661,072

UNITED STATES PATENT OFFICE 2,661,072

AIR-COOLED EXHAUST MUFFLER WITH SOUND ABSORBING PANELS

Carl W. Lemmerman, West Hartford, Conn., assignor to C. W. Lemmerman, Inc., Hartford, Conn., a corporation of Connecticut Application November 14, 1950, Serial No. 195,515

9 Claims. (Cl. 181—42)

This invention relates to a muffler construction adapted to muffle the exhaust sounds of jet engines or the like while the engine or aircraft is undergoing ground tests and relates particularly to a muffler construction which is suited for operation in the field as well as in a factory test cell.

Jet, turbo-jet and rocket engines now being used and tested in aircraft exhaust gases at extremely high temperatures thereby posing a problem relating to the construction of sound mufflers which may be utilized while ground testing the engines and aircraft. It has been found desirable to partially cool the exhaust stream by drawing air at atmospheric temperature into the muffler along with the exhaust gases. If the air drawn into the muffler is removed from the area immediately surrounding the aircraft, another problem arises in that eddy and burble currents will be set up about the aircraft surfaces and will therefore disrupt or interfere with the testing operations being performed on the aircraft.

Accordingly, it is an object of the present invention to provide an improved muffler adaptable to muffle the sound of an aircraft engine while the aircraft is undergoing ground tests within a factory test cell or in the field.

It is another object of the invention to provide a muffler construction which will operate efficiently at the high temperatures encountered in ground testing aircraft having jet engines or the like.

It is a further object of the present invention to provide a muffler construction for muffling the exhaust sounds of a jet engine or the like during testing operations and which will draw a supply of atmospheric air from an area remote from the aircraft to cool the exhaust gases.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
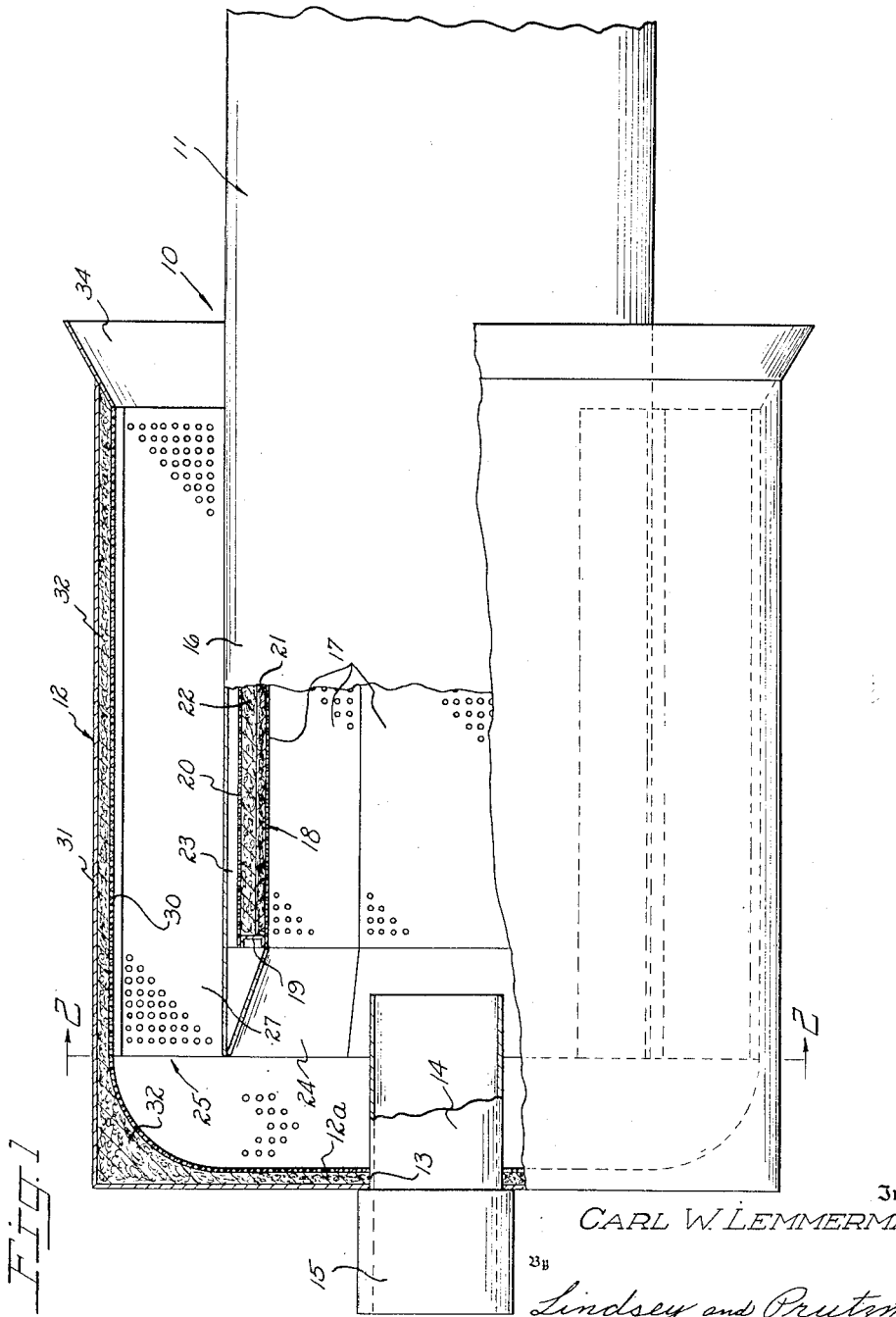
Figure 1 is a fragmentary side view, with parts shown in vertical cross section, of a muffler constructed in accordance with the features of the present invention.
Figure 2:
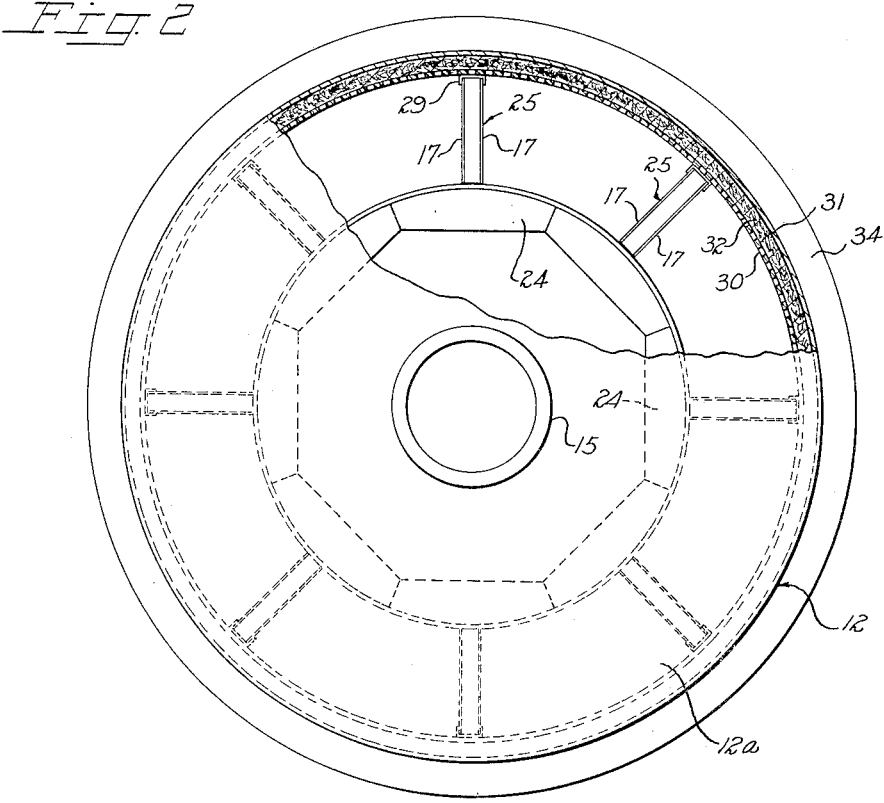
Figure 2 is a transverse vertical sectional view with parts in elevation viewed substantially as indicated by the arrows 2—2 in Figure 1.
Figure 3:
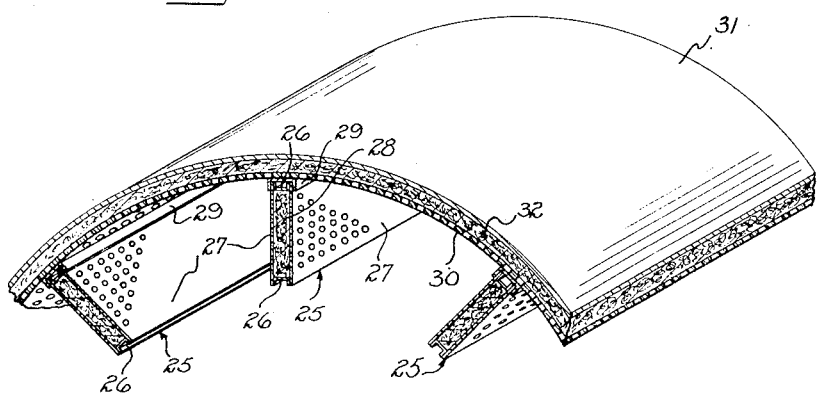
Figure 3 is a perspective view of a section taken from the air intake muffler which surrounds the exhaust gas muffler.

As shown in detail in the drawings, the reference numeral 10 indicates generally a muffler constructed in accordance with this invention and having as the main elements of its construction an exhaust gas or high heat muffler 11 and a muffler 12 which surrounds muffler 11 to form a generally annular air inlet chamber. The air intake muffler 12 is of generally cup-shaped configuration and receives the one end of the generally tubular gas muffler 11 in concentric spaced relation. Preferably the spacing is such that the distance from the end wall 12a of the muffler 12 to the inner end of the muffler 11 is equal to the distance separating their side walls.

The end wall of the air muffler 12 has a central aperture 13 receiving an adapter conduit 14 extending inwardly into the opening of the gas muffler 11 and extending outwardly for connection to the exhaust stack of a jet engine or the like. The adapter 14 may receive the exhaust stack directly or may be connected thereto by conduit means (not shown) which may vary for the different types and sizes of exhaust parts. A cooling device 15, which forms no part of the present invention, embraces the adapter extension 14 adjacent the outer surface of the end wall of muffler 12 and may comprise an annular water jacket with suitable perforations on its inner surface to spray water into the exhaust gases.

The gas muffler or high heat muffler 11 has a tubular outer wall 16 which may be readily formed of sheet metal. The inner wall of the high heat muffler 11 comprises a plurality of angularly related perforated sheet metal plates 17, each of which forms the innermost wall of a plurality of acoustical panels 18.

The aforementioned panels 18 are described and claimed in my pending application Serial No. 141,387 filed January 31, 1950, entitled Muffler Construction, but for convenience and for ease and understanding of the present invention the panels will be briefly described herein.

Each acoustical panel 18 comprises a rectangular frame made up of channel members 19 which are closed on the innermost side by the plates 17 and on the outermost sides by similar perforated plates 20. The space between the plates 17 and 20 may be filled with one or more layers of sound absorbing material such as metallic tinsel or mineral wool. In the embodiment illustrated two such packs 21 and 22 are shown which packs may be separated by additional perforated plates and if desired, one or more heat insulating sheets of asbestos fibres or the like may be disposed within the panels adjacent the perforate plates or between the packs. The assembled panels 18 are secured to each other along their longitudinal edges in abutting relationship, as by welding or the like, to provide an acoustical liner for the wall 16.

The panels 18 function as sound resonators wherein the apertures in the plates 17 pass the high frequency sound waves while the lower frequency sound and shock waves cause vibration of the plates 17. The packs 21 and 22 absorb the vibrations of the plates 17 and tend to dissipate the high frequency sound waves transmitted therethrough. The perforate plates 20 also pass certain high frequency waves and vibrate with the relatively lower frequency waves. The space 23 between the perforated plates 20 and the outer shell or wall 16 of the muffler 11 provides an additional sound resonator which, for most contemplated installations, requires no pack for the dissipation of the sound waves escaping through the panel 18. However, a pack similar to the packs 21 or 22 may be provided in the space 23 if desired or found necessary.

The shell 16 of the high heat muffler extends beyond the panels 18 toward the end wall of the cup-shaped muffler 12 and a flared end opening for the muffler 11 is provided by a plurality of circumferentially arranged plates 24 which are secured to the end of the shell 16 and to the ends of the panels 18 as by welding. This flared inner end of the muffler extends beyond the inner end of the adapter conduit 14 so that the exhaust gases from the pipe 14 are introduced directly into the high heat muffler 11.

The air muffler 12 is secured in spaced relation to the high heat muffler 11 by a plurality of longitudinally directed, circumferentially spaced acoustical panels 25. Each of the panels 25 is formed similarly to the panels 18 and comprises a rectangular structure having channel members 26 closed by perforated plates 27 having a sound absorbing pack 28 disposed therebetween. The radially inwardly disposed channel member 26 on each panel is welded to the shell 16 of the high heat muffler 11 and the radially outwardly disposed channel member 26 of the panel 25 is slidably received in a larger channel 29 which is welded to the inner wall 30 of the muffler 12.

The inner wall 30 of the muffler 12 is formed of perforated sheet metal spaced inwardly from the outer wall or shell 31. The space between the walls 31 and 30 is filled with a sound absorbing pack 32. Thus it will be seen that the walls 30 and 31 and the pack 32 provide a sound absorbing and dissipating structure similar to the panels 18 and 25.

At the open end of the cup-shaped air intake muffler 12 the outer wall 31 extends beyond the inner wall 30 and a frusto-conically shaped sheet metal annulus 34 is welded to the outer ends of the walls 30 and 31 to provide a flared end opening. The outside diameter of the annulus 34 is greater than the outside diameter of the muffler to provide a scoop for air intake purposes and it has been found desirable to have the area enclosed by the scoop equal to approximately twice the cross sectional area between the mufflers 11 and 12.

From the foregoing description of the structural elements of the invention and their relationship to each other, it will be seen that an aspirator effect is provided by the stream of exhaust gases entering the high heat muffler 11 from the adapter pipe 14 under pressure and at relatively high velocity. This, of course, will cause a low pressure area to be formed in the air muffler 12 and atmospheric air will be drawn into the air muffler 12 through the flared end opening at the annulus 34. The air will travel in the air muffler 12 to the entrance to the high heat muffler 11 where it will mix with and cool the exhaust gases. Sounds accompany the air stream into the air muffler 12, but the sounds are dissipated by the acoustical structure of the muffler 12 and the supporting panels 25. The sounds accompanying the exhaust stream are dissipated within the high heat muffler 11.

The muffler 11 may be formed with an elbow (not shown) to exhaust the gases in any desired manner or direction and the entire structure 10 may be mounted on a portable platform (not shown) so that it can be transported as a unit from place to place. For instance, it may be desirable to run ground tests on the aircraft or its engines while the aircraft is parked on a runway or the like and the unit 10 may be brought to the aircraft so that the adapter 14 may be connected to the exhaust stack of the engine.

In designing the muffler apparatus for various installations, certain critical dimensions will be varied depending upon the installation and upon the engine to which the muffler is attached. One muffler construction found to be typical comprises a high heat muffler 11 having a 7-foot outside diameter, an air muffler 12 having an outside diameter of 11 feet except at the flared opening 34 where the diameter is 12 feet. It has been found that the adapter pipe 14 should be inserted within the high heat muffler 11, a distance equal to one-fifth the inside diameter of the high heat muffler.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A sound muffler construction for ground testing jet engines or the like, comprising a generally tubular acoustical duct having an inlet opening at one end and an exhaust opening at the other end, a generally cup-shaped acoustical member disposed in spaced relation about the inlet end of said duct defining a generally annular air inlet opening therebetween and communicating with said inlet end opening, and means connectable to the exhaust port of the engine having an outlet disposed within the inlet end opening for introducing the exhaust gases of the engine into said acoustical duct.

2. A sound muffler construction for ground testing jet engines or the like, comprising a generally tubular shell having an inlet opening at one end for receiving the exhaust gases from the engine and having an exhaust opening at the other end, a plurality of acoustical panels secured to the inner surface of said shell and circumferentially disposed therearound in edge abutting relationship to each other, a second shell member of generally cup-shaped configuration having an acoustical liner disposed in spaced relation about the inlet end opening to define a generally annular air intake opening therebetween communicating with said end opening, and tubular connecting means connectable to the exhaust port of the engine having an outlet disposed within the inlet end opening for introducing the exhaust gases thereto.

3. A sound muffler construction for ground testing jet engines or the like, comprising a generally tubular shell having an acoustical liner and an inlet opening at one end and an outlet opening at the other end, a second shell member of generally cup-shaped configuration having an acoustical liner disposed in spaced relation about said tubular shell and having its end wall equally spaced from the inlet end thereof to define a generally annular air inlet in communication with the inlet end opening, and conduit means connectable to the exhaust port of the engine having an outlet disposed within the inlet end opening for introducing the exhaust gases thereto.

4. A sound muffler construction capable of performance while subjected to the high temperatures encountered in ground testing jet engines or the like, comprising a generally tubular acoustical duct having an inlet end opening, a generally cup-shaped acoustical member of larger diameter than said acoustical duct, a plurality of longitudinally directed acoustical panels secured to the outer surface of said acoustical duct in circumferentially spaced relation securing said cup-shaped acoustical member in spaced relation about said inlet end of said duct so as to define a generally annular air inlet opening therebetween, and conduit means having an outlet end disposed within said inlet end opening and having an inlet end for connection to the exhaust port of the engine whereby exhaust gases may be introduced into said inlet end opening.

5. A sound muffler capable of operation while subjected to high temperatures of the order encountered in ground testing jet engines or the like, comprising a generally tubular shell having an end opening for receiving the exhaust gases from the engine, a plurality of acoustical panels secured to the inner surface of said shell and circumferentially disposed therearound in edge abutting relationship to each other, a plurality of acoustical panels secured to the outer surface of said shell in circumferentially spaced relation, a second shell member of generally cup-shaped configuration having an acoustical liner engaging the circumferentially spaced panels and secured thereby in spaced relationship about said end opening to define a generally annular air intake opening between said liner and said tubular shell, means secured by said liner and said cup-shaped shell defining a flared end opening for the air intake, and tubular connecting means connectable to the exhaust port of the engine having an outlet disposed within said end opening for introducing exhaust gases thereto.

6. A sound muffler capable of operation while subjected to high temperatures of the order encountered in ground testing jet engines or the like, comprising a generally tubular shell having an end opening for receiving the exhaust gases from the engine, a plurality of acoustical panels secured to the inner surface of said shell and circumferentially disposed therearound in edge abutting relationship to each other, a plurality of acoustical panels secured to the outer surface of said shell in circumferentially spaced relation, a second shell member of generally cup-shaped configuration having an acoustical liner engaging the circumferentially spaced panels and secured thereby in spaced relationship about said end opening to define a generally annular air intake opening between said liner and said tubular shell, means secured by said liner and said cup-shaped shell defining a flared end opening for the air intake, tubular connecting means connectable to the exhaust port of the engine having an outlet disposed within said end opening for introducing exhaust gases thereto, and means secured to said tubular shell defining a flared entrance for said inlet end opening.

7. A sound muffler construction for ground testing jet engines or the like, comprising a generally tubular shell, a plurality of acoustical panels secured to the inner surface of said shell and circumferentially disposed therearound in edge abutting relationship to each other, said acoustical panels comprising a substantially rectangular frame closed at each end by perforate plates and having a sound absorbing pack disposed therebetween, a second shell member of generally cup-shaped configuration having an acoustical liner comprising a perforate shell of cup-shaped configuration spaced inwardly of said first mentioned cup-shaped shell with a sound absorbing pack disposed therebetween, said perforate shell being disposed about said tubular shell in spaced relation thereto and having its end wall equally spaced from the inlet end thereof to define a generally annular air chamber in communication with said inlet opening, and conduit means having an outlet disposed within said inlet end opening for introducing thereto exhaust gases from the engine.

8. A sound muffler construction for ground testing jet engines or the like, comprising a generally tubular acoustical duct having an inlet end opening and an acoustical liner, a second shell member of generally cup-shaped configuration having an acoustical liner comprising a perforate wall spaced from said shell and a sound absorbing pack disposed therebetween, a plurality of acoustical panels secured in circumferentially spaced relation about said tubular shell, said panels comprising a substantially rectangular frame closed by perforate plates and having a sound absorbing pack therebetween, means on said cup-shaped shell engaging said panels in sliding relation whereby said cup-shaped shell is secured in radially spaced relation to said tubular shell to define a generally annular air inlet opening therebetween, ring means secured at the end of said cup-shaped shell to define a flared opening for said air intake, and conduit means connectable to the exhaust port of the engine having an outlet disposed within said inlet end opening for introducing the exhaust gases of the engine into said acoustical duct.

9. A sound muffler construction for ground testing jet engines or the like, comprising a generally tubular shell having an acoustical liner and an inlet opening at one end and an exhaust opening at the other end, a second shell member of generally cup-shaped configuration having an acoustical liner disposed in spaced relation about said tubular shell and having its end wall spaced from the inlet end thereof to define a generally annular air inlet in communication with the inlet end opening, means on said second shell member defining an aperture in register with the inlet end opening, and conduit means secured by said second shell member within said aperture having an outlet disposed within the inlet end opening and having an inlet for connection to the exhaust port of the engine.

CARL W. LEMMERMAN.

References Cited in the file of this patent

UNITED STATES PATENTS

| Number | Name | Date |
| --- | --- | --- |
| 792,804 | Williams | June 20, 1905 |
| 1,584,315 | Maxim | May 1, 1926 |
| 1,605,484 | Thompson et al. | Nov. 2, 1926 |
| 2,050,581 | Orem | Aug. 11, 1936 |
| 2,169,658 | Newton | Aug. 15, 1939 |
| 2,363,236 | Fluor | Nov. 21, 1944 |